Aug. 31, 1943.  M. L. VAN OVEREEM  2,328,515
PHONOGRAPH TURNTABLE DRIVING DEVICE
Filed April 24, 1941

Inventor
Marius Leonard van Overeem
by his attorneys
Howson and Howson

UNITED STATES PATENT OFFICE 2,328,515

PHONOGRAPH TURNTABLE DRIVING DEVICE

Marius Leonard van Overeem, Hilversum, Netherlands; vested in the Alien Property Custodian Application April 24, 1941, Serial No. 390,176
In the Netherlands November 1, 1939

7 Claims. (Cl. 274—9)

The invention relates in the first place to a device for driving the turntable of a phonograph with a constant velocity of the sound groove. With the usual phonograph and records a constant velocity of the turntable is applied. In this case, however, the velocity of the groove of the sound spiral is considerably smaller near the centre of the record than near the edge. Yet the velocity of the groove near the centre of the record makes it possible to record and to reproduce as good a sound quality as the velocity of the groove of the spiral near the edge of the record. Consequently this increase of the velocity of the groove from the centre towards the edge signifies a loss of playing time. Therefore the invention has in the first place for its object to procure a device by which it is possible to vary the angular velocity of the turntable during the travelling of the recording and reproducing member over the record in such a manner that the velocity of the groove remains constant over all the surface of the record. By this the longest possible duration of the playing time is obtained.

Devices for driving the turntable of a phonograph with a constant velocity of the groove are known per se. Also such an apparatus provided with a clockwork is known already in which the angular velocity of the clockwork and the turntable varies by this, that the velocity is determined by a friction wheel driven by the turntable and moving simultaneously with the recording or reproducing member in radial direction over the turntable, whereby the angular velocity is kept constant by a regulator. Further it has been proposed already to vary the angular velocity of the driving motor with the aid of a centrifugal regulator, the braking surfaces being displaced dependent on the path of the stylus or with the aid of a disc rotating between the poles of an electro-magnet which, by the displacement of the magnet in dependence on the path of the stylus, is braked with variable strength. Finally a device of the said type is known with which driving occurs by means of a motor with constant angular velocity, whereas the transmission between the motor and the turntable is varied in dependence on the path of the stylus with the aid of two friction discs.

The said well-known devices have the drawback that they are based on the principle of friction or of braking. Though the principle of friction results in the advantage that the constant velocity of the groove is due to the variable transmission itself, its drawback consists in that a friction always works inaccurately and in the long run is subject to variation, whereas moreover one is always restricted to a single predetermined constant velocity of the groove. The method of braking has also the drawback that in the long run it is subjected to variations due to wear and tear of the regulator or to variations in the field intensity of the magnet. When using a braking disc moreover the drawback will present itself that it results indeed in a special braking operation, but that it is no velocity limiter and that the principle of the constant groove velocity is not contained in the variable transmission itself but should be effected by an auxiliary member which is to be determined experimentally. Consequently the said well-known apparatus will differ the one from the other, due to the manufacturing differences which cannot be avoided, so that the reproduction will gradually alter and the recorded discs cannot be interchanged.

The invention has for its object to improve the construction and to provide in the first place a device by which it is possible to drive the turntable of the phonograph with a constant velocity of the groove. Since the phonograph according to the invention can work with a constant velocity of the groove it is possible to normalize the constant. It will appear from the following that by the application of the principle according to the invention also the possibility arises to drive at will the turntable of a phonograph, without any alteration of the apparatus, with a constant number of revolutions so that the phonograph can also be adjusted at the normalized velocities of $33\frac{1}{3}$, 78 and 80 revolutions per minute.

The device according to the invention is substantially characterized in that the turntable of the phonograph is driven by a synchronous motor fed by a source of current the frequency of which is dependent on the place of the reproducing- or recording-member with respect to the record.

According to the invention the frequency of the source of current feeding the synchronous motor is controlled by means of an electric band of definite length travelling over two rollers, provided with a number of openings and driven with constant velocity, said band influencing a photo-electric cell arranged opposite a source of light by alternatingly allowing the light of the source of light to pass through the openings and intercepting it, in consequence of which the frequency of the produced photocell current, which influences the source of current feeding the synchronous motor, is varied in dependence on the number of light impulses per time unit, said variation being effected by the fact that one of the rollers is displaced by the recording- and reproducing-member in dependence on the position of said member with respect to the record, whereas the other roller is arranged stationarily.

The elastic band, preferably rubber band, is according to the invention driven by a very small synchronous motor driving the stationary roller. Since the other roller is moved by the reproducing- or recording-member, for example due to the fact that said roller is attached to said member, dependent on the position of said member with respect to the record the band will be stretched to a greater or smaller extent and consequently the number of openings in the band passing along the photo-electric cell and the source of light per time-unit will accordingly be smaller or greater respectively, so that the frequency of the current of the photoelectric cell varies accordingly. The alternating current produced by the photoelectric cell can be amplified so as to obtain an intensity which is sufficiently high to feed the synchronous driving motor for the turntable. In this manner the number of revolutions of the synchronous motor is absolutely determined by the frequency of the source of current and since the obtained frequency variation varies entirely according to the rotation velocity of the turntable, an absolutely constant velocity of the groove is produced.

The invention is further elucidated along the lines of the drawing illustrating an embodiment.

Figure 1:
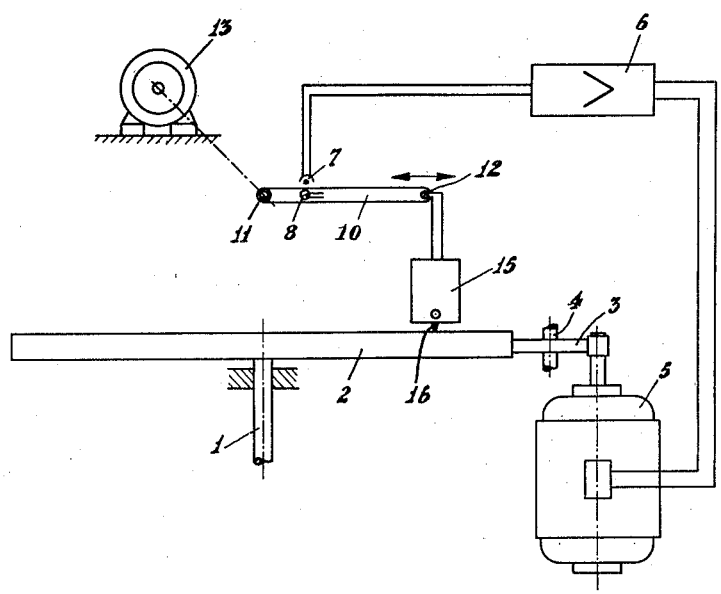
Figure 1 is a schematical illustration of the device according to the invention.
Figure 2:
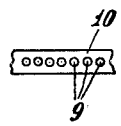
Figure 2 is a detail.

The device according to the invention comprises a turntable 2 arranged on a spindle 1. By the intermediary of a hard rubber wheel 3 arranged on a spindle 4 it is driven by an electromotor 5. This electromotor 5 is fed by a lamp amplifier 6 receiving its energy from a photoelectric cell 7. Said photoelectric cell 7 is illuminated by a constant source of light 8 but this light is alternately intermitted and transmitted by an elastic band 10, for example a rubber band, in which openings 9 (Figure 2) are provided and which is moving with the aid of two rollers 11 and 12. The roller 11 is driven with constant velocity by a small synchronous motor 13, whereas the roller 12 is mounted on the reproducing- or recording-member 15 which with its stylus 16 is resting on the phonograph disc lying on the turntable 2.

If the stylus 16 is near the centre of the disc the band 10, which under all circumstances has a length twice the distance between the stylus 16 and the centre of the record, will be as short as possible whereas its length gradually increases according as the stylus 16 approaches the edge of the record.

It is clear that the entire device is not subject to any alteration, even not in the course of time since the frequency regulation is exclusively effected by the elastic band 10.

It is still to be observed that the phonograph according to the invention can work in a very simple way with different constant velocities of the groove so that the quality of the sound too can be altered. To this end it is only necessary to substitute the elastic band by another band having a greater or a smaller number of openings.

I claim:

1. In a device for controlling the speed of a motor for driving the turntable of a phonograph with a constant velocity of the record sound groove, a recording or reproducing member, a light source, a photoelectric cell responsive to light from said source for supplying electrical impulses for controlling the current supplied to the motor, a perforated traveling elastic band controlling the supply of light from said source to said photoelectric cell and means connecting said band and said recording or reproducing member for varying the length of said band upon movement of said member.

2. In a device for controlling the speed of a motor for driving the turntable of a phonograph with a constant velocity of the record sound groove, a recording or reproducing member, a light source, a photoelectric cell responsive to light from said source for supplying electrical impulses for controlling the current supplied to the motor, a perforated traveling elastic band controlling the supply of light from said source to said photoelectric cell, means connecting said band and said recording or reproducing member for varying the length of said band upon movement of said recording and reproducing member and means operating said band at a uniform rate of speed.

3. In a device for controlling the speed of a motor for driving the turntable of a phonograph with a constant velocity of the record sound groove, a recording or reproducing member, a light source, a photoelectric cell responsive to light from said source for supplying electrical impulses for controlling the current supplied to the motor, a perforated traveling elastic band controlling the supply of light from said source to said photoelectric cell, means operating said band at a uniform rate of speed and means carried by said recording or reproducing member and supporting said band for varying the length of said band upon movement of said member.

4. In a device for controlling the speed of a motor for driving the turntable of a phonograph with a constant velocity of the record sound groove, a recording or reproducing member, a light source, a photoelectric cell responsive to light from said source for supplying electrical impulses for controlling the current supplied to the motor, a perforated traveling elastic band controlling the supply of light from said source to said photoelectric cell, pulleys supporting said band, means operating one of said pulleys to operate said band at a uniform rate of speed and means supporting another of said pulleys from said recording or reproducing member for varying the length of said band by movement of said member.

5. In a means for controlling an electric current, a photo-electric cell, a source of light for rendering said cell effective, a uniformly operating elastic band having alternating opaque and transparent portions controlling the passage of light from said source to said cell and means for varying the effective length of said band to vary the frequency of the light impulses on said cell from said light source.

6. In a means for controlling an electric current, a photo-electric cell, a source of light for rendering said cell effective, a uniformly operating band having alternating opaque and transparent portions controlling the passage of light from said source to said cell, said band permitting variation of its length during operation, and means for varying the effective length of said band to vary the frequency of exposure of said cell to said light source.

7. In a means for controlling an electric current, a photoelectric cell, a source of light for rendering said cell effective, a uniformly operating elastic band having uniformly spaced perforated portions permitting the passage of light from said source to said cell, and means for varying the distance apart of said perforated portions to vary the frequency of electrical impulses from said cell.

MARIUS LEONARD van OVEREEM.